(12) United States Patent
Jeong

(10) Patent No.: US 11,511,600 B2
(45) Date of Patent: Nov. 29, 2022

(54) COOLING SYSTEM FOR VEHICLE

(71) Applicants: Hyundai Motor Company, Seoul (KR); Kia Motors Corporation, Seoul (KR)

(72) Inventor: Seong Bin Jeong, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 260 days.

(21) Appl. No.: 16/824,128

(22) Filed: Mar. 19, 2020

(65) Prior Publication Data
US 2021/0053422 A1 Feb. 25, 2021

(30) Foreign Application Priority Data
Aug. 19, 2019 (KR) .................. 10-2019-0101205

(51) Int. Cl.
| | |
|---|---|
| *B60H 1/32* | (2006.01) |
| *F25B 49/02* | (2006.01) |
| *F01P 3/18* | (2006.01) |
| *F01P 5/02* | (2006.01) |

(52) U.S. Cl.
CPC .............. *B60H 1/3227* (2013.01); *F01P 3/18* (2013.01); *F01P 5/02* (2013.01); *F25B 49/027* (2013.01); *F25B 2339/04* (2013.01)

(58) Field of Classification Search
CPC .. B60H 1/3227; F01P 3/18; F01P 5/02; F25B 49/027; F25B 2339/04
USPC ...................................... 123/41.49
See application file for complete search history.

(56) References Cited

U.S. PATENT DOCUMENTS

| | | | | |
|---|---|---|---|---|
| 2012/0318473 | A1* | 12/2012 | Nishikawa | F28D 1/05391 165/41 |
| 2014/0366816 | A1* | 12/2014 | Platt | F01P 3/18 137/340 |
| 2016/0153727 | A1* | 6/2016 | Nakamura | F28F 3/027 165/109.1 |
| 2017/0335745 | A1* | 11/2017 | Benjamin | F02G 5/04 |
| 2019/0186848 | A1* | 6/2019 | Han | F28D 7/16 |
| 2019/0255914 | A1* | 8/2019 | Ikeda | B60H 1/3205 |
| 2020/0200489 | A1* | 6/2020 | McDermott | B21C 37/151 |

* cited by examiner

*Primary Examiner* — Mahmoud Gimie
(74) *Attorney, Agent, or Firm* — Fox Rothschild LLP

(57) ABSTRACT

A cooling system for a vehicle is provided. The cooling system includes a condenser having a first inlet header, a first outlet header, and a plurality of first tubes connecting between the first inlet header and the first outlet header. Additionally, a radiator of the system includes a second inlet header, a second outlet header, and a plurality of second tubes connecting between the second inlet header and the second outlet header. A fan assembly is disposed in front of or behind the condenser and the radiator and includes at least one cooling fan. The condenser and the radiator are arranged side by side on the front of the vehicle.

11 Claims, 16 Drawing Sheets

COOLING SYSTEM FOR VEHICLE

CROSS-REFERENCE TO RELATED APPLICATION

This application is based on and claims the benefit of priority to Korean Patent Application No. 10-2019-0101205, filed on Aug. 19, 2019, the disclosure of which is incorporated herein in its entirety by reference.

TECHNICAL FIELD

The present disclosure relates to a cooling system for a vehicle, and more particularly, to a cooling system for a vehicle, in which a radiator and a condenser are arranged side by side on the front of the vehicle, thereby reducing the thickness of the cooling system and the front overhang of the vehicle.

BACKGROUND

Generally, the front of a vehicle is equipped with a cooling system, and the cooling system is disposed behind a front grille of the vehicle. The cooling system includes a radiator that cools a coolant circulating in an internal combustion engine cooling system, a condenser that condenses a refrigerant circulating in an air conditioner system or a refrigeration system, and a cooling fan assembly that suctions outside air through the front grille of the vehicle. The internal combustion engine cooling system may be designed to cool an internal combustion engine, and the air conditioner system or the refrigeration system may be designed to cool or heat the interior space of the vehicle.

In the existing cooling system, since a required cooling temperature (e.g., 65° C.) of the refrigerant by the condenser is less than a required cooling temperature (e.g., 110° C.) of the coolant by the radiator, the cooling efficiency of the condenser should be higher than the cooling efficiency of the radiator, and thus the condenser is located in front of the radiator. In other words, the condenser, the radiator, and the cooling fan assembly in the existing cooling system are arranged in a line (e.g., sequentially) along a longitudinal direction of the vehicle, making it difficult to reduce the thickness of the cooling system. For example, the existing cooling system has a thickness of at least 150 mm. The front overhang of the vehicle is a distance from a front wheel to a foremost end of the vehicle. A shorter front overhang improves vehicle dynamic characteristics, ensures stability during rotation, and obtains a minimum turning radius. Small electric vehicles such as mobility vehicles need to have a short front overhang.

Meanwhile, an electric vehicle includes a power electronics (PE) cooling system that cools electric motors and electronic components using the coolant cooled by the radiator, a battery cooling system that cools a battery, and a refrigeration system that cools or heats the interior space of the vehicle. Heat exchange occurs between the coolant circulating in the battery cooling system and the refrigerant circulating in the refrigeration system. Since the condenser in the refrigeration system of the electric vehicle must consider both the cooling of the battery and the cooling of the interior space of the vehicle, the heat output of the condenser in the electric vehicle is greater than twice as high as that of the condenser in an internal combustion engine vehicle, and the required cooling temperature (e.g., 65° C.) of the coolant by the radiator of the electric vehicle is approximately twice as low as the required cooling temperature (e.g., 110° C.) of the coolant by the radiator of the internal combustion engine vehicle. Since the size of the radiator in the electric vehicle should be more than twice that of the radiator in the internal combustion engine vehicle, the thickness or size of the cooling system may be increased. As a result, a front compartment of the vehicle may be configured inefficiently, and the short front overhang may not be achieved.

The above information described in this background section is provided to assist in understanding the background of the inventive concept, and may include any technical concept which is not considered as the prior art that is already known to those skilled in the art.

SUMMARY

The present disclosure provides a cooling system for a vehicle, in which a radiator and a condenser are arranged side by side along a width or height direction of the vehicle, thereby reducing the thickness of the cooling system and the front overhang of the vehicle.

According to an aspect of the present disclosure, a cooling system for a vehicle may include: a condenser including a first inlet header, a first outlet header, and a plurality of first tubes connecting between the first inlet header and the first outlet header; a radiator having a second inlet header, a second outlet header, and a plurality of second tubes connecting between the second inlet header and the second outlet header; and a fan assembly disposed in front of or behind the condenser and the radiator, and having at least one cooling fan. The condenser and the radiator may be arranged side by side on the front of the vehicle.

An edge of the condenser may be disposed adjacent to an edge of the radiator. The cooling system may further include an auxiliary chamber disposed within the second outlet header. The auxiliary chamber may fluidly communicate with the first outlet header. The condenser and the radiator may be arranged side by side along a width direction of the vehicle. The first inlet header may be disposed above the first outlet header and the second inlet header may be disposed above the second outlet header.

The condenser and the radiator may be arranged side by side along a height direction of the vehicle. The cooling system may further include a first support member and a second support member supporting the condenser, the radiator, and the fan assembly. The first inlet header of the condenser and the second inlet header of the radiator may be supported by the first support member, and the first outlet header of the condenser and the second outlet header of the radiator may be supported by the second support member. The condenser and the radiator may be arranged to be inclined in a symmetrical manner.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
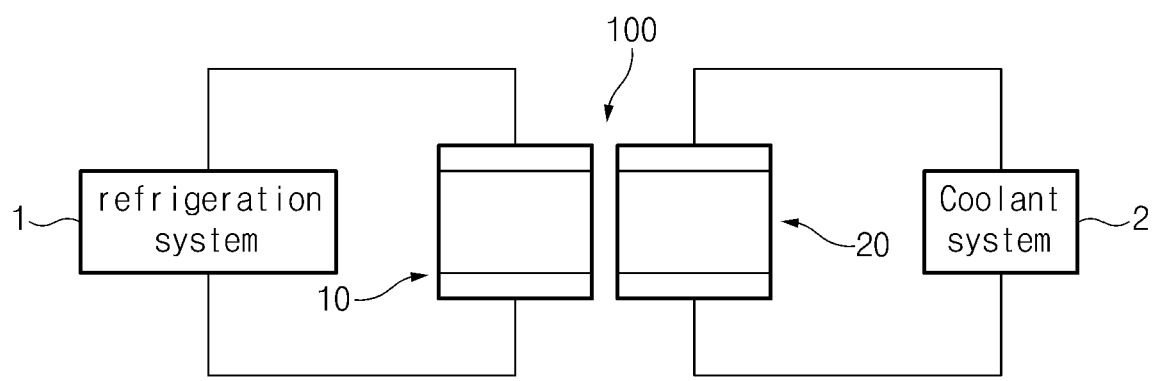
FIG. 1 illustrates a schematic view of a cooling system for a vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinal knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
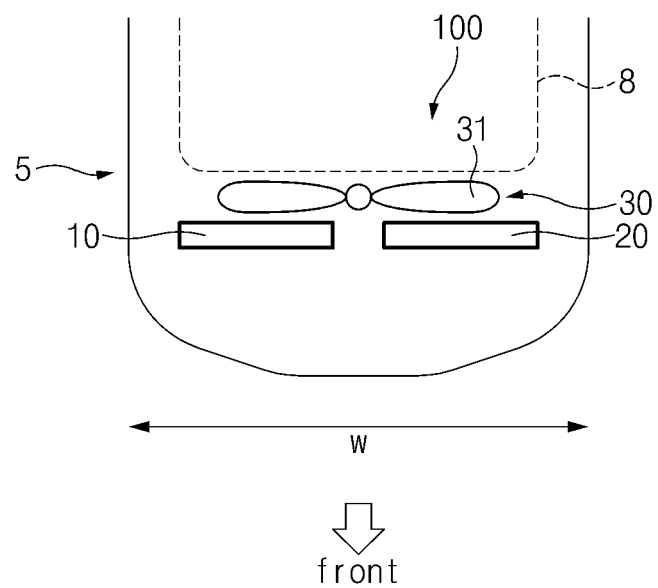
FIG. 2 illustrates a plan view of a cooling system for a vehicle according to an exemplary embodiment of the present disclosure.

Referring to FIGS. 1 and 2, a cooling system 100 for a vehicle, according to an exemplary embodiment of the present disclosure, may include a condenser 10 configured to condense a refrigerant that circulates in a refrigeration system 1, a radiator 20 configured to cool a coolant that circulates in a coolant system 2, and a fan assembly 30 which is disposed behind the condenser 10 and the radiator 20. For example, the refrigeration system 1, such as an air conditioner system, may be configured to cool or heat an interior space of the vehicle by circulation of the refrigerant. The coolant system 2, such as an internal combustion engine cooling system of an internal combustion engine vehicle and a power electronics (PE) system of an electric vehicle, may be configured to cool target objects by circulation of the coolant.

Referring to FIG. 2, a front compartment 8 may be disposed on the front of the vehicle. In the internal combustion engine vehicle, an internal combustion engine and relevant components thereof may be disposed within the front compartment 8, and in the electric vehicle, power electronics such as a power unit (e.g., an electric motor, a reduction gear), an inverter, a circuit box, and a positive temperature coefficient (PTC) heater may be disposed within the front compartment 8. The condenser 10 and the radiator 20 may be arranged side by side on the front 5 of the vehicle along a width direction of the vehicle (see a direction indicated by arrow W).

Figure 3:
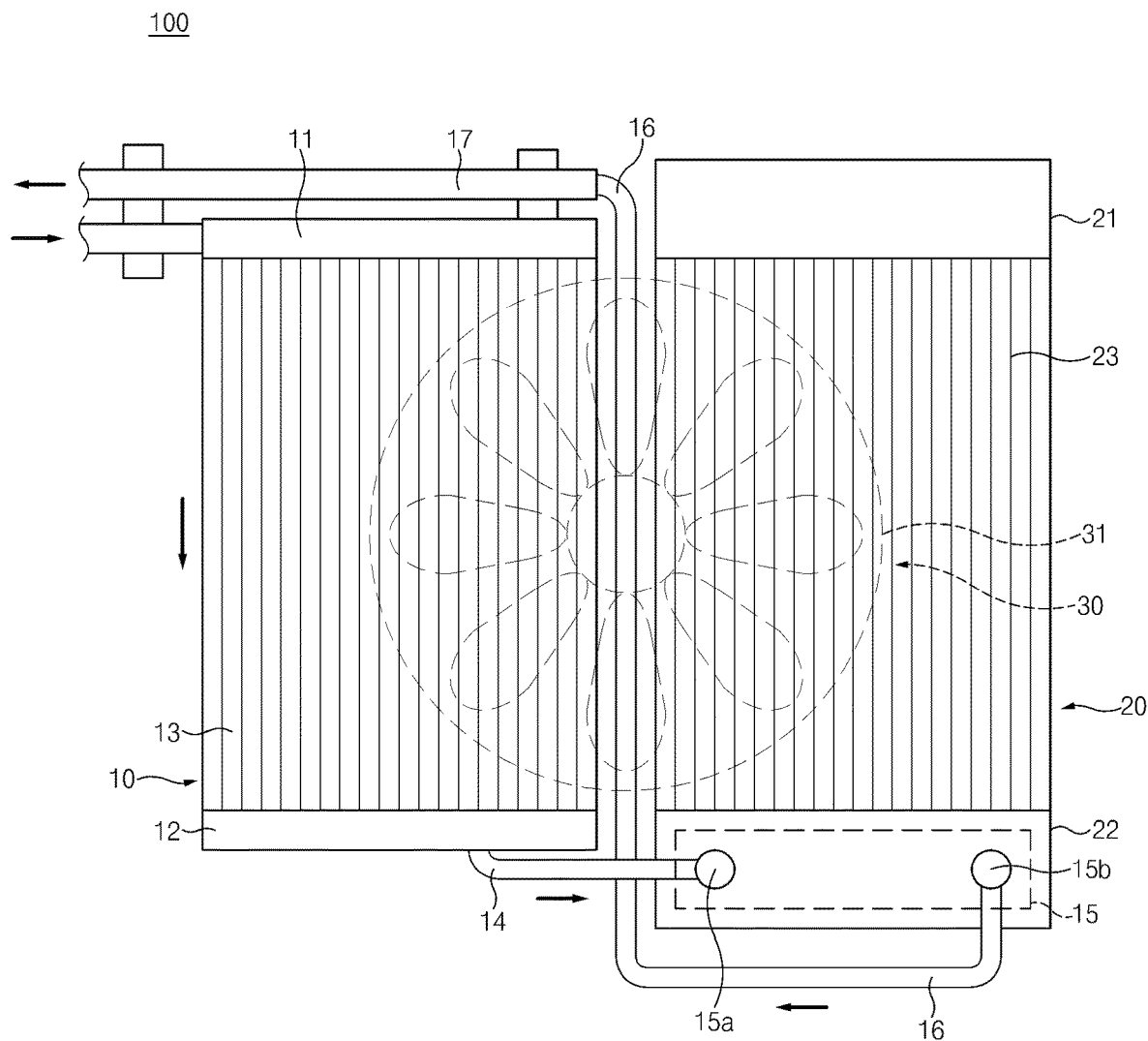
FIG. 3 illustrates a front view of a cooling system for a vehicle according to an exemplary embodiment of the present disclosure.

The condenser 10 may be connected to the refrigeration system 1, and be configured to condense the refrigerant that circulates in the refrigeration system 1. Referring to FIG. 3, the condenser 10 may include a first inlet header 11, a first outlet header 12, and a plurality of first tubes 13 connecting between the first inlet header 11 and the first outlet header 12. Each first tube 13 may extend in a height direction of the vehicle, and the plurality of first tubes 13 may be disposed parallel to each other. The first inlet header 11 and the first outlet header 12 may extend in the width direction of the vehicle. Since the first inlet header 11 is disposed above the first outlet header 12, flow resistance may decrease when the refrigerant flows through the plurality of first tubes 13. The plurality of first tubes 13 may be an air-cooled structure, and thus, the refrigerant passing through the plurality of first tubes 13 may be liquefied and condensed by air.

The radiator 20 may be connected to the coolant system 2, and be configured to cool the coolant that circulates in the coolant system 2. Referring to FIG. 3, the radiator 20 may include a second inlet header 21, a second outlet header 22, and a plurality of second tubes 23 connecting between the second inlet header 21 and the second outlet header 22. Each second tube 23 may extend in the height direction of the vehicle, and the plurality of second tubes 23 may be disposed parallel to each other. The second inlet header 21 and the second outlet header 22 may extend in the width direction of the vehicle. Since the second inlet header 21 is disposed above the second outlet header 22, flow resistance may decrease when the coolant flows through the plurality of second tubes 23.

Figure 4:
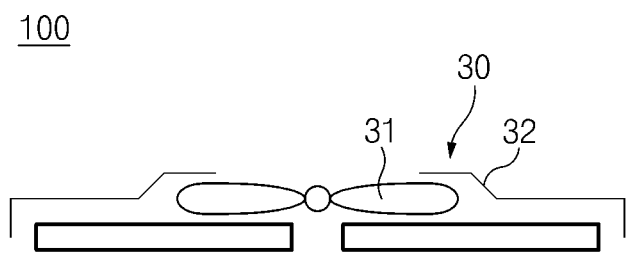
FIG. 4 illustrates a plan view of FIG. 3.
Figure 6:
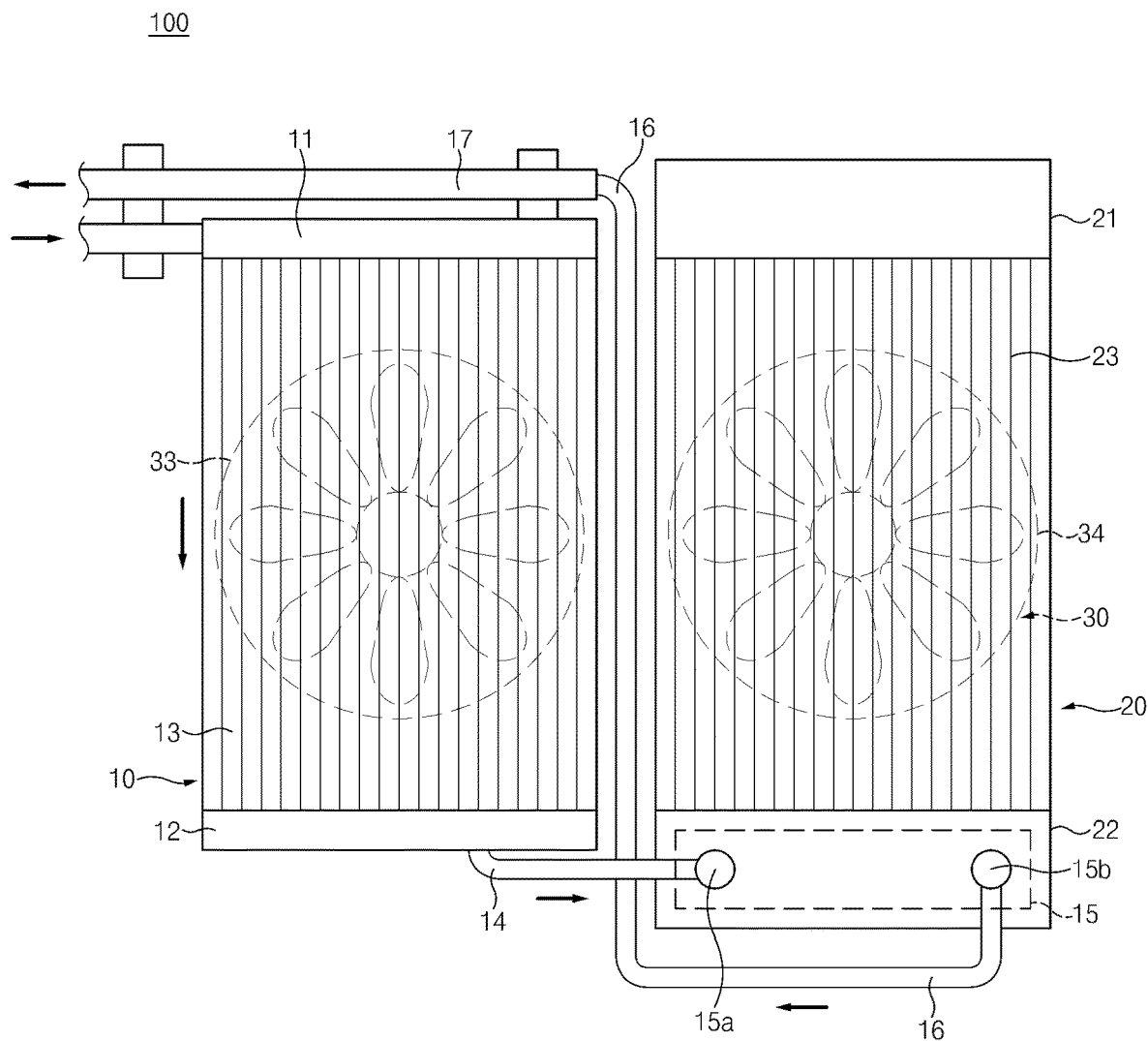
FIG. 6 illustrates a front view of a cooling system for a vehicle according to another exemplary embodiment of the present disclosure.

Referring to FIGS. 3 and 4, the fan assembly 30 may include a cooling fan 31 and a fan shroud 32 rotatably supporting the cooling fan 31. Referring to FIG. 4, one cooling fan 31 may be configured to blow air towards the condenser 10 and the radiator 20. According to an alternative exemplary embodiment, the fan assembly 30 may include a first cooling fan 33 disposed behind the condenser 10 and a second cooling fan 34 disposed behind the radiator 20 as illustrated in FIG. 6. The first cooling fan 33 may blow the outside air toward the condenser 10, and the second cooling fan 34 may blow the outside air toward the radiator 20.

Referring to FIG. 3, the cooling system 100 may further include an auxiliary chamber 15 fluidly connected to the first outlet header 12 of the condenser 10, and a discharge pipe 17 fluidly connected to the auxiliary chamber 15. The auxiliary chamber 15 may be disposed within the second outlet header 22. A first connecting conduit 14 may connect the first outlet header 12 to an inlet 15a of the auxiliary chamber 15, to provide fluid communication between the auxiliary chamber 15 and the first outlet header 12. A second connecting conduit 16 may connect an outlet 15b of the auxiliary chamber 15 to an inlet of the discharge pipe 17, an outlet of the discharge pipe 17 is directly connected to an inlet of an expansion valve of the refrigeration system 1. The expansion valve may be a thermostatic expansion valve (TXV). The discharge pipe 17 may be disposed adjacent to the first inlet header 11, and the discharge pipe 17 may be parallel to the first inlet header 11.

Figure 5:
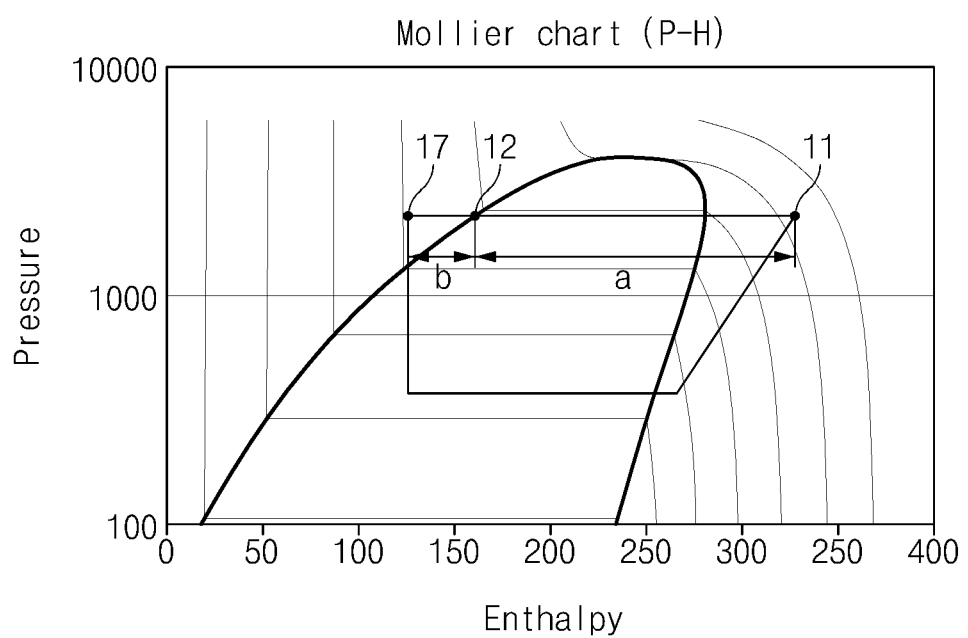
FIG. 5 illustrates a Mollier chart of a condenser in a cooling system for a vehicle according to an exemplary embodiment of the present disclosure.

In this configuration, the refrigerant compressed by a compressor of the refrigeration system 1 may flow into the first inlet header 11 of the condenser 10, and then the refrigerant may be distributed from the first inlet header 11 to the plurality of first tubes 13, and flow into the first outlet header 12 through the plurality of first tubes 13. The refrigerant flowing in the plurality of first tubes 13 may be air-cooled by the outside air (see section a in FIG. 5). The refrigerant may flow from the first outlet header 12 to the auxiliary chamber 15 through the first connecting conduit 14, and the refrigerant received in the auxiliary chamber 15 may be water-cooled by the low-temperature coolant contained in the second outlet header 22 (see section b in FIG. 5).

As a negative pressure is generated in the expansion valve of the refrigeration system 1, the refrigerant contained in the auxiliary chamber 15 may be discharged to the expansion valve of the refrigeration system 1 through the second connecting conduit 16 and the discharge pipe 17. The condenser 10 may combine the air-cooled structure using the plurality of first tubes 13 contacting the outside air and the water-cooled structure using the low-temperature coolant contained in the second outlet header 22 and the auxiliary chamber 15, thereby improving condensation performance.

Figure 7:
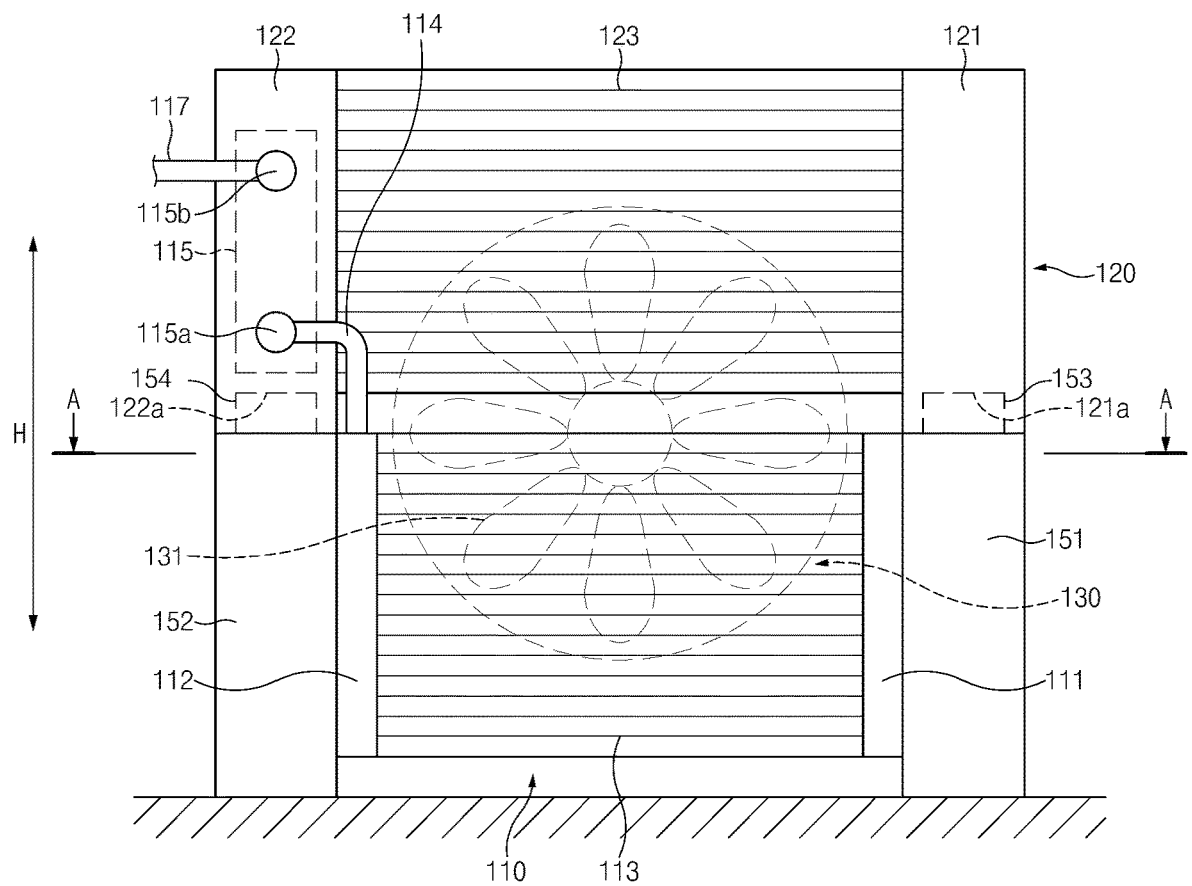
FIG. 7 illustrates a front view of a cooling system for a vehicle according to another exemplary embodiment of the present disclosure.
Figure 8:
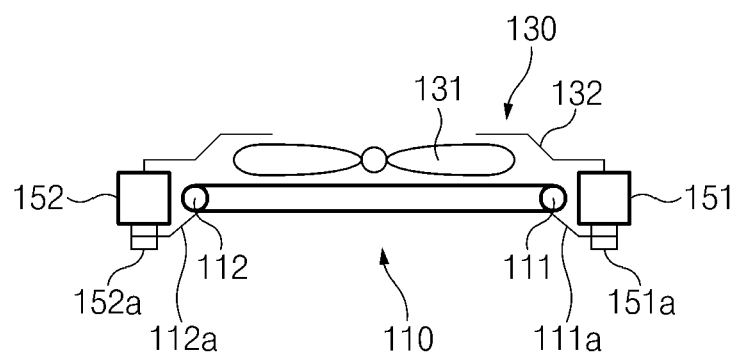
FIG. 8 illustrates a cross-sectional view taken along line A-A of FIG. 7 according to another exemplary embodiment of the present disclosure.

Referring to FIGS. 7 and 8, a cooling system 200 for a vehicle, according to another exemplary embodiment of the present disclosure, may include a condenser 110 configured to condense a refrigerant, a radiator 120 configured to cool a coolant, and a fan assembly 130 disposed behind the condenser 110 and the radiator 120. The condenser 110 and the radiator 120 may be arranged side by side on edge on the front of the vehicle along a height direction of the vehicle (see a direction indicated by arrow H). In particular, an edge of the condenser 110 may be disposed adjacent to an edge of the radiator 120.

The condenser 110 may be connected to the refrigeration system 1 (see FIG. 1), and be configured to condense the refrigerant that circulates in the refrigeration system 1. The condenser 110 may include a first inlet header 111, a first outlet header 112, and a plurality of first tubes 113 connecting between the first inlet header 111 and the first outlet header 112. Each first tube 113 may extend in a width direction of the vehicle, and the plurality of first tubes 113 may be disposed parallel to each other. Both ends of the first tube 113 may be connected to the first inlet header 111 and the first outlet header 112, respectively, and the first inlet header 111 and the first outlet header 112 may extend in the height direction of the vehicle.

The radiator 120 may be connected to the coolant system 2 (see FIG. 1), and be configured to cool the coolant that circulates in the coolant system 2. The radiator 120 may include a second inlet header 121, a second outlet header 122, and a plurality of second tubes 123 connecting between the second inlet header 121 and the second outlet header 122. Each second tube 123 may extend in the width direction of the vehicle, and the plurality of second tubes 123 may be disposed parallel to each other. Both ends of the second tube 123 may be connected to the second inlet header 121 and the second outlet header 122, respectively, and the second inlet header 121 and the second outlet header 122 may extend in the height direction of the vehicle.

Referring to FIGS. 7 and 8, the fan assembly 130 may include a cooling fan 131 and a fan shroud 132 rotatably supporting the cooling fan 131. Referring to FIG. 8, one cooling fan 131 may be configured to blow air towards the condenser 110 and the radiator 120.

According to an exemplary embodiment of the present disclosure, the cooling system 200 for a vehicle may include a first support member 151 and a second support member 152 that support the condenser 110, the radiator 120, and the fan assembly 130. In particular, the first support member 151 and the second support member 152 may be spaced apart from each other in the width direction of the vehicle. The first inlet header 111 of the condenser 110 and the second inlet header 121 of the radiator 120 may be supported by the first support member 151, and the first outlet header 112 of the condenser 110 and the second outlet header 122 of the radiator 120 may be supported by the second support member 152.

Referring to FIG. 7, the condenser 110 may be disposed below the radiator 120, and the first support member 151 and the second support member 152 may be disposed on both left and right sides of the condenser 110. The first support member 151 and the second support member 152 may extend in the height direction of the vehicle.

Referring to FIG. 8, the first inlet header 111 of the condenser 110 may be mounted to the first support member 151 using a fitting structure, fasteners, or similar fastening mechanism. For example, the first inlet header 111 may include at least one mounting projection 111a, and the first support member 151 may include at least one mounting bracket 151a. The mounting projection 111a may be coupled to the mounting bracket 151a using a fitting structure, fasteners, or similar fastening mechanism to allow the first inlet header 111 to be supported by the first support member 151.

Referring to FIG. 8, the first outlet header 112 of the condenser 110 may be mounted to the second support member 152 using a fitting structure, fasteners, or similar fastening mechanism. For example, the first outlet header 112 may include at least one mounting projection 112a, and the second support member 152 may include at least one mounting bracket 152a. The mounting projection 112a may be coupled to the mounting bracket 152a using a fitting structure, fasteners, or similar fastening mechanism to allow the first outlet header 112 to be supported by the second support member 152.

Referring to FIG. 7, a bottom end of the second inlet header 121 of the radiator 120 may be supported by a top end of the first support member 151. For example, the second inlet header 121 may include a groove 121a formed in the bottom end thereof, and the first support member 151 may include a projection 153 formed on the top end thereof. The projection 153 of the first support member 151 may be fitted into the groove 121a of the second inlet header 121.

Referring to FIG. 7, a bottom end of the second outlet header 122 of the radiator 120 may be supported by a top end of the second support member 152. For example, the second inlet header 122 may include a groove 122a formed in the bottom end thereof, and the second support member 152 may include a projection 154 formed on the top end thereof. The projection 154 of the second support member 152 may be fitted into the groove 122a of the second outlet header 122.

Referring to FIGS. 7 and 8, the fan assembly 130 may include the cooling fan 131 and the fan shroud 132 rotatably supporting the cooling fan 131. Referring to FIG. 7, one cooling fan 131 may be configured to blow air towards the condenser 110 and the radiator 120. Both edges of the fan shroud 132 of the fan assembly 130 may be coupled to the first support member 151 and the second support member 152, respectively.

Referring to FIG. 7, the cooling system 200 may further include an auxiliary chamber 115 in fluid communication with the first outlet header 112 of the condenser 110, and a discharge pipe 117 connected to the auxiliary chamber 115. The auxiliary chamber 115 may be disposed within the second outlet header 122. A connecting conduit 114 may connect the first outlet header 112 to an inlet 115a of the auxiliary chamber 115 to provide fluid communication between the auxiliary chamber 115 and the first outlet header 112. The discharge pipe 117 may be connected to an outlet 115b of the auxiliary chamber 115. The discharge pipe 117 may be directly connected to the inlet of the expansion valve of the refrigeration system 1. The expansion valve may be a thermostatic expansion valve (TXV). According to an alternative exemplary embodiment, the condenser 110 may be disposed above the radiator 120, and the other configuration and operation may be similar to those illustrated in FIGS. 7 and 8.

Referring to FIGS. 9 to 12, a condenser 210 and a radiator 220 may be arranged side by side (e.g., proximate to each other or sequentially) on the front 5 of the vehicle along the height direction of the vehicle, and the condenser 210 and the radiator 220 may be disposed adjacent to front grilles 3 and 4 of the vehicle. In particular, the condenser 210 and the radiator 220 may be inclined with respect to the height direction of the vehicle at a predetermined angle. In other words, the condenser 210 and the radiator 220 may be arranged such that they are not parallel to the height direction of the vehicle, and are inclined symmetrically or intersect at a predetermined angle, thereby guiding the outside air toward the front compartment 8 in various ways.

Figure 9:
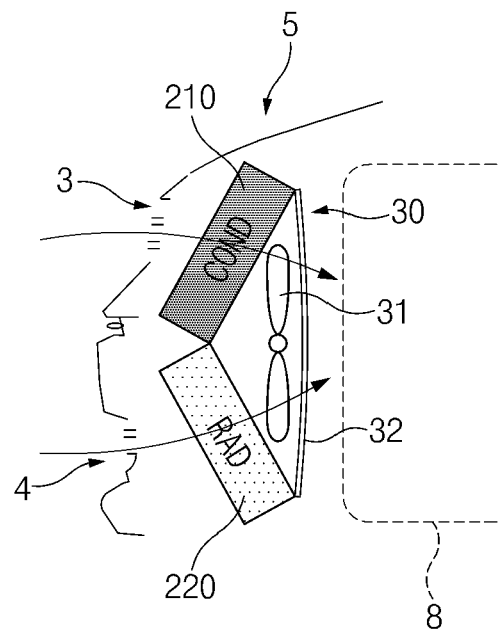
FIG. 9 illustrates a side view of a cooling system for a vehicle according to another exemplary embodiment of the present disclosure.

Referring to FIGS. 9 to 12, the condenser 210 and the radiator 220 may not be parallel to the height direction of the vehicle, but may be inclined to the height direction of the vehicle at a predetermined angle. Referring to FIG. 9, the condenser 210 may be disposed above the radiator 220. The condenser 210 may be inclined with a top end thereof disposed farther from the front grilles 3 and 4 of the vehicle than a bottom end thereof. The radiator 220 may be inclined with a top end thereof disposed closer to the front grilles 3 and 4 of the vehicle than a bottom end thereof. This may allow the flow of air passing through the condenser 210 and the radiator 220 to be guided toward a central space of the front compartment 8. The fan assembly 30 may be disposed behind the condenser 210 and the radiator 220.

Figure 10:
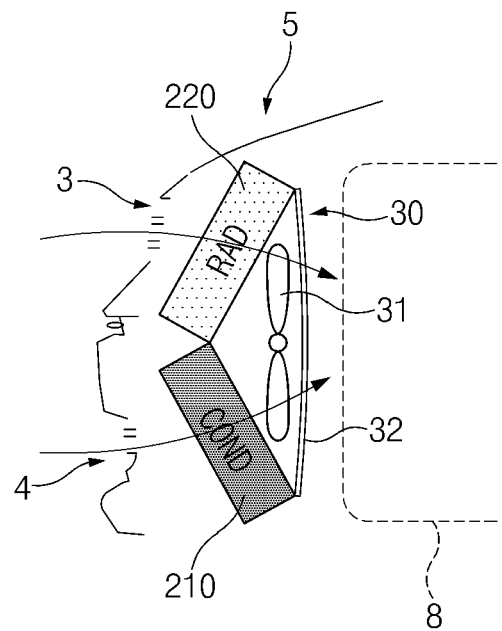
FIG. 10 illustrates a side view of a cooling system for a vehicle according to another exemplary embodiment of the present disclosure.

Referring to FIG. 10, the radiator 220 may be disposed above the condenser 210. The radiator 220 may be inclined with a top end thereof disposed farther from the front grilles 3 and 4 of the vehicle than a bottom end thereof. The condenser 210 may be inclined with a top end thereof disposed closer to the front grilles 3 and 4 of the vehicle than a bottom end thereof. This may allow the flow of air passing through the condenser 210 and the radiator 220 to be guided toward the central space of the front compartment 8. The fan assembly 30 may be disposed behind the condenser 210 and the radiator 220.

Figure 11:
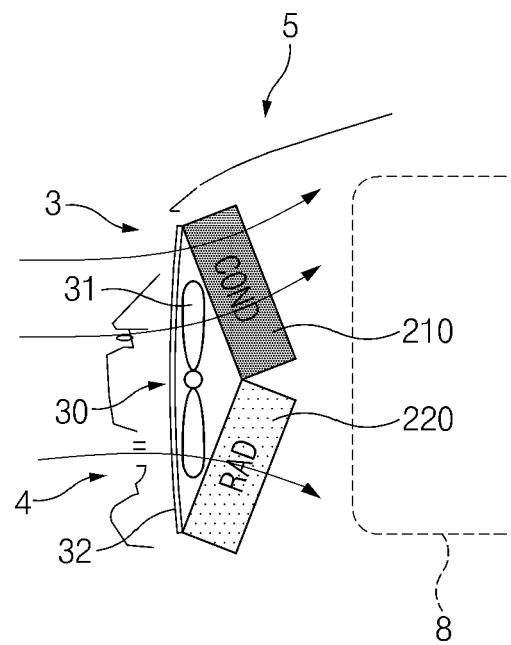
FIG. 11 illustrates a side view of a cooling system for a vehicle according to another exemplary embodiment of the present disclosure.

Referring to FIG. 11, the condenser 210 may be disposed above the radiator 220. The condenser 210 may be inclined with a top end thereof disposed closer to the front grilles 3 and 4 of the vehicle than a bottom end thereof. The radiator 220 may be inclined with a top end thereof disposed farther from the front grilles 3 and 4 of the vehicle than a bottom end thereof. This may allow the flow of air passing through the condenser 210 and the radiator 220 to be symmetrically guided toward an upper space and a lower space of the front compartment 8. The fan assembly 30 may be disposed in front of the condenser 210 and the radiator 220.

Figure 12:
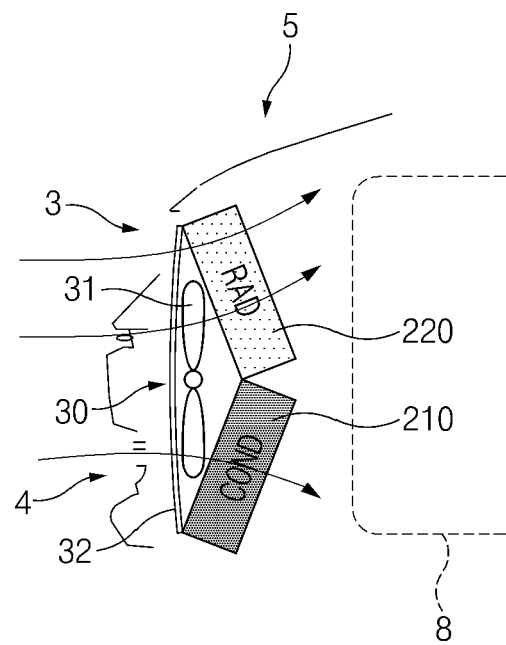
FIG. 12 illustrates a side view of a cooling system for a vehicle according to another exemplary embodiment of the present disclosure.

Referring to FIG. 12, the radiator 220 may be disposed above the condenser 210. The radiator 220 may be inclined with a top end thereof disposed closer to the front grilles 3 and 4 of the vehicle than a bottom end thereof. The condenser 210 may be inclined with a top end thereof disposed farther from the front grilles 3 and 4 of the vehicle than a bottom end thereof. This may allow the flow of air passing through the condenser 210 and the radiator 220 to be symmetrically guided toward the upper space and the lower space of the front compartment 8. The fan assembly 30 may be disposed in front of the condenser 210 and the radiator 220.

Referring to FIGS. 13 to 16, the condenser 210 and the radiator 220 may be arranged side by side on the front 5 of the vehicle along the width direction of the vehicle, and the condenser 210 and the radiator 220 may be disposed adjacent to the front grilles 3 and 4 of the vehicle. In particular, the condenser 210 and the radiator 220 may be inclined with respect to the width direction of the vehicle at a predetermined angle. In other words, the condenser 210 and the radiator 220 may be arranged such that they are not parallel to the width direction of the vehicle, and may be inclined symmetrically or intersect at a predetermined angle to thus guide the outside air toward the front compartment 8 in various ways.

Figure 13:
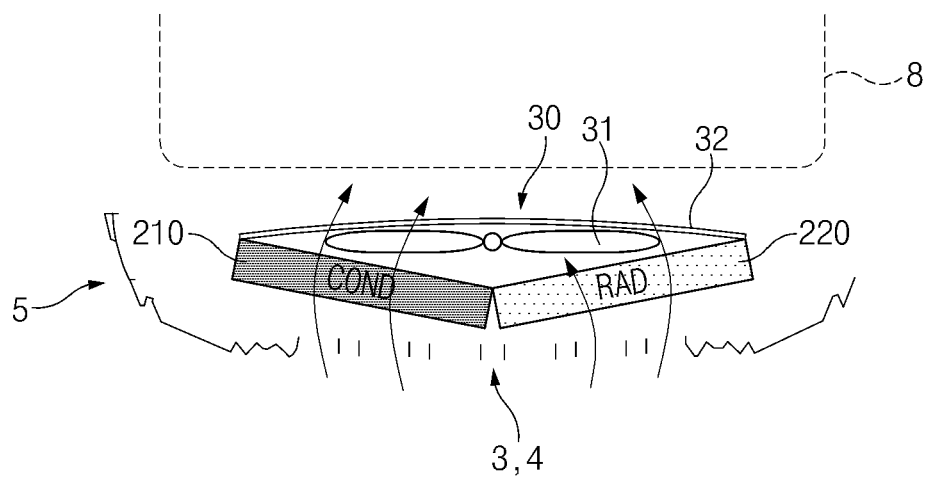
FIG. 13 illustrates a plan view of a cooling system for a vehicle according to another exemplary embodiment of the present disclosure.

Referring to FIG. 13, the condenser 210 may be disposed on the right side of the vehicle, and the radiator 220 may be disposed on the left side of the vehicle. The condenser 210 may be inclined with a right end thereof disposed farther from the front grilles 3 and 4 of the vehicle than a left end thereof. The radiator 220 may be inclined with a right end thereof disposed closer to the front grilles 3 and 4 of the vehicle than a left end thereof. This may allow the flow of air passing through the condenser 210 and the radiator 220 to be guided toward the central space of the front compartment 8.

Figure 14:
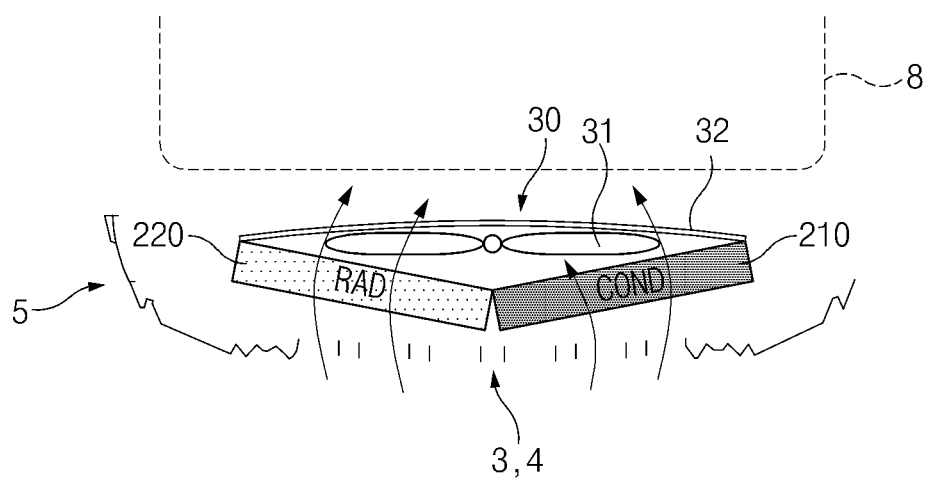
FIG. 14 illustrates a plan view of a cooling system for a vehicle according to another exemplary embodiment of the present disclosure.

Referring to FIG. 14, the radiator 220 may be disposed on the right side of the vehicle, and the condenser 210 may be disposed on the left side of the vehicle. The radiator 220 may be inclined with a right end thereof disposed farther from the front grilles 3 and 4 of the vehicle than a left end thereof. The condenser 210 may be inclined with a right end thereof disposed closer to the front grilles 3 and 4 of the vehicle than a left end thereof. This may allow the flow of air passing through the condenser 210 and the radiator 220 to be guided toward the central space of the front compartment 8.

Figure 15:
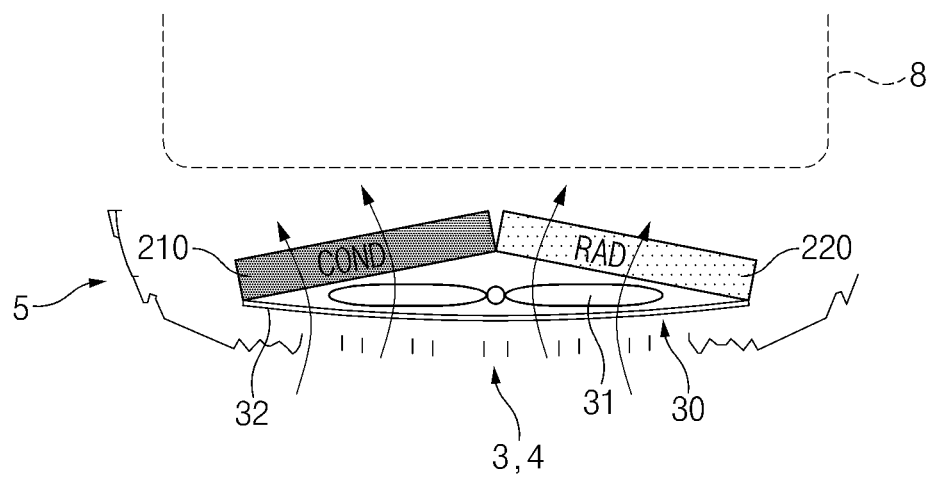
FIG. 15 illustrates a plan view of a cooling system for a vehicle according to another exemplary embodiment of the present disclosure.

Referring to FIG. 15, the condenser 210 may be disposed on the right side of the vehicle, and the radiator 220 may be disposed on the left side of the vehicle. The condenser 210 may be inclined with a right end thereof disposed closer to the front grilles 3 and 4 of the vehicle than a left end thereof. The radiator 220 may be inclined with a right end thereof disposed farther from the front grilles 3 and 4 of the vehicle than a left end thereof. This may allow the flow of air passing through the condenser 210 and the radiator 220 to be symmetrically guided toward left and right spaces of the front compartment 8.

Figure 16:
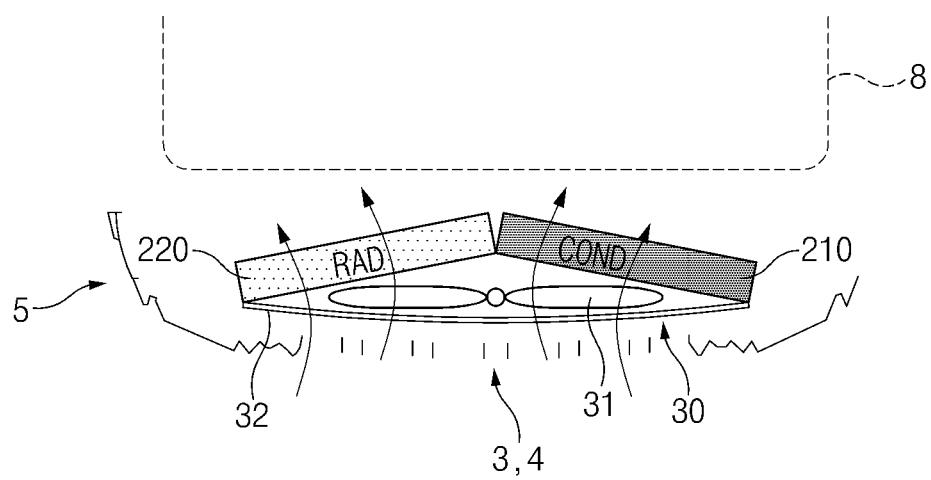
FIG. 16 illustrates a plan view of a cooling system for a vehicle according to another exemplary embodiment of the present disclosure.

Referring to FIG. 16, the radiator 220 may be disposed on the right side of the vehicle, and the condenser 210 may be disposed on the left side of the vehicle. The radiator 220 may be inclined with a right end thereof disposed closer to the front grilles 3 and 4 of the vehicle than a left end thereof. The condenser 210 may be inclined with a right end thereof disposed farther from the front grilles 3 and 4 of the vehicle than a left end thereof. This may allow the flow of air passing through the condenser 210 and the radiator 220 to be symmetrically guided toward the left and right spaces of the front compartment 8.

According to the above-described exemplary embodiments of the present disclosure, by arranging the condenser 10, 110, or 210 and the radiator 20, 120, or 220 side by side on the front of the vehicle along the width direction or height direction of the vehicle, the thickness of the cooling system and the front overhang of the vehicle may be reduced. In particular, by embedding the auxiliary chamber in fluid communication with the condenser in the outlet header of the radiator, the condenser may adopt a dual cooling structure of the air-cooled structure and the water-cooled structure, whereby the condensation performance of the condenser may be significantly improved.

As set forth above, according to exemplary embodiments of the present disclosure, the condenser and the radiator may be arranged side by side on the front of the vehicle along the width direction or height direction of the vehicle and thus, the thickness of the cooling system and the front overhang of the vehicle may be reduced. In addition, according to exemplary embodiments of the present disclosure, the auxiliary chamber in fluid communication with the condenser may be embedded in the outlet header of the radiator, and thus, the condenser may combine the air-cooled structure and the water-cooled structure, thereby significantly improving the condensation performance.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A cooling system for a vehicle, comprising:
   a condenser having a first inlet header, a first outlet header, and a plurality of first tubes connecting between the first inlet header and the first outlet header;
   a radiator having a second inlet header, a second outlet header, and a plurality of second tubes connecting between the second inlet header and the second outlet header;
   an auxiliary chamber disposed within the second outlet header; and
   a fan assembly disposed in front of or behind the condenser and the radiator, and having at least one cooling fan,
   wherein the condenser and the radiator are arranged side by side on the front of the vehicle,
   wherein the first inlet header having an inlet port and is disposed above the first outlet header having an outlet port;
   wherein the auxiliary chamber fluidly communicates with the first outlet header.

2. The cooling system according to claim 1, wherein an edge of the condenser is disposed adjacent to an edge of the radiator.

3. The cooling system according to claim 1, wherein the condenser and the radiator are arranged side by side along a width direction of the vehicle.

4. The cooling system according to claim 1, wherein the second inlet header is disposed above the second outlet header.

5. The cooling system according to claim 1, wherein the condenser and the radiator are arranged side by side along a height direction of the vehicle.

6. The cooling system according to claim 5, further comprising:
   a first support member and a second support member supporting the condenser, the radiator, and the fan assembly.

7. The cooling system according to claim 6, wherein the first inlet header of the condenser and the second inlet header of the radiator are supported by the first support member, and the first outlet header of the condenser and the second outlet header of the radiator are supported by the second support member.

8. The cooling system according to claim 1, wherein the condenser and the radiator are arranged to be inclined in a symmetrical manner.

9. The cooling system according to claim 5, wherein the condenser and the radiator are disposed in parallel to the height direction of the vehicle.

10. The cooling system according to claim 1, wherein the condenser and the radiator are inclined to the height direction of the vehicle at a predetermined angle.

11. A vehicle having a cooling system according to claim 1.

* * * * *